(12) United States Patent
Sakamoto et al.

(10) Patent No.: US 11,040,584 B2
(45) Date of Patent: Jun. 22, 2021

(54) PNEUMATIC TIRE (71) Applicant: The Yokohama Rubber Co., LTD., Tokyo (JP)

(72) Inventors: Hayato Sakamoto, Hiratsuka (JP); Atsushi Tanno, Hiratsuka (JP)

(73) Assignee: The Yokohama Rubber Co., LTD.

( * ) Notice: Subject to any disclaimer, the term of this patent is extended or adjusted under 35 U.S.C. 154(b) by 575 days.

(21) Appl. No.: 15/329,965

(22) PCT Filed: Jul. 22, 2015

(86) PCT No.: PCT/JP2015/070853
§ 371 (c)(1),
(2) Date: Jan. 27, 2017

(87) PCT Pub. No.: WO2016/017505
PCT Pub. Date: Feb. 4, 2016

(65) Prior Publication Data
US 2017/0259630 A1     Sep. 14, 2017

(30) Foreign Application Priority Data
Jul. 28, 2014   (JP) .............................. JP2014-153220

(51) Int. Cl.
*B60C 17/04*   (2006.01)
*B60C 23/04*   (2006.01)
*B60C 19/00*   (2006.01)

(52) U.S. Cl.
CPC .......... *B60C 23/0493* (2013.01); *B60C 17/04* (2013.01); *B60C 19/003* (2013.01);
(Continued)

(58) Field of Classification Search
CPC .... B60C 23/0491–0498; B60C 19/003; B60C 17/04; B60C 23/0493
See application file for complete search history.

(56) References Cited

U.S. PATENT DOCUMENTS 5,218,861 A * 6/1993 Brown ................ B60C 23/0493
                                                    73/146.5
6,217,683 B1 * 4/2001 Balzer ................ B60C 23/0493
                                                    152/152.1
(Continued)

FOREIGN PATENT DOCUMENTS

DE      30 03 666      8/1981
JP     2002-502765     1/2002
(Continued)

OTHER PUBLICATIONS

International Search Report for International Application No. PCT/JP2015/070853 dated Oct. 6, 2015, 4 pages, Japan.

*Primary Examiner* — Jacob T Minskey
*Assistant Examiner* — Adrien J Bernard
(74) *Attorney, Agent, or Firm* — Thorpe North & Western (57) ABSTRACT

A pneumatic tire comprises: a fastener disposed on a tire inner surface, the mechanical fastener being a first mechanical fastener of a separatable pair of mechanical fasteners composed of at least two fastener members; wherein a) the fastener members sandwich a rubber-coated fiber reinforced member and fix together; b) the fastener is disposed within a region such that the following relationship is satisfied: $0.05 \leq A/H \leq 0.4$, where A is a height in a tire radial direction from a bead toe end to a center position (C) of the fastener, and H is a height of a cross section of the tire; and c) the fiber reinforced member includes fiber bundles disposed in alignment in at least one direction, and forms an angle (minor angle θ) with a tire circumferential direction such that: 30 degrees $\leq \theta \leq$ 90 degrees.

8 Claims, 8 Drawing Sheets (52) U.S. Cl.
CPC ...... *B60C 23/0459* (2013.01); *B60C 23/0488* (2013.01); *B60C 23/0489* (2013.01)

(56) References Cited

U.S. PATENT DOCUMENTS

| | | | | |
|---|---|---|---|---|
| 6,462,650 | B1* | 10/2002 | Balzer | B60C 23/0493 152/152.1 |
| 7,243,533 | B2* | 7/2007 | Mancosu | B60C 23/041 73/146 |
| 7,332,047 | B2* | 2/2008 | Majumdar | B29D 30/0662 152/154.1 |
| 7,900,665 | B2* | 3/2011 | Shimura | B60C 19/00 152/152.1 |
| 9,908,372 | B2* | 3/2018 | Jyouza | B60C 23/0493 |
| 2003/0155054 | A1* | 8/2003 | Bell | B60C 23/0493 152/151 |
| 2006/0260726 | A1 | 11/2006 | Bell | |
| 2009/0320580 | A1* | 12/2009 | Mancosu | B60C 23/0493 73/146 |
| 2010/0108222 | A1 | 5/2010 | Bell | |
| 2011/0113630 | A1 | 5/2011 | Bell | |
| 2012/0024439 | A1* | 2/2012 | Tanno | B60C 23/0493 152/154.1 |
| 2012/0248274 | A1* | 10/2012 | Scheungraber | B60C 23/0493 248/309.1 |
| 2012/0298272 | A1* | 11/2012 | Tanno | B29D 30/0061 152/450 |

FOREIGN PATENT DOCUMENTS

| | | | | |
|---|---|---|---|---|
| JP | 2005-517581 | 6/2005 | | |
| JP | 2006-044503 | 2/2006 | | |
| JP | 2007-062405 | 3/2007 | | |
| JP | 2009-298329 | 12/2009 | | |
| JP | 2009298329 | A * | 12/2009 | ......... B60C 23/0493 |
| JP | 2012-025318 | 2/2012 | | |
| JP | 2012-240465 | 12/2012 | | |
| WO | WO 1999/41093 | 8/1999 | | |
| WO | WO 2003/070496 | 8/2003 | | |
| WO | WO-2004002758 | A1 * | 1/2004 | ........... B60C 23/041 |
| WO | WO-2012160896 | A1 * | 11/2012 | ......... B60C 23/0493 |

* cited by examiner

PNEUMATIC TIRE

TECHNICAL FIELD

The present technology relates to a pneumatic tire, and particularly relates to a pneumatic tire capable of retaining an object secured on an inner surface of the pneumatic tire for an extended period of time.

BACKGROUND ART

In recent years, research and development into how to dispose an object having various specific functions on an inner surface of a pneumatic tire has been performed.

For example, attachment methods are known in which a tire tag (radio frequency identification tag), a chip, or a sound-absorbing member is attached to such as an innerliner of a green tire using a surface fastener such as a hook and loop fastener or a hook and hook fastener (see Japanese Unexamined Patent Application Publication Nos. 2005-517581A and 2006-044503A).

The surface fasteners proposed in Japanese Unexamined Patent Application Publication Nos. 2005-517581A and 2006-044503A have preferred embodiments which exhibit relatively strong engagement force when attached, and engagement on a surface can be achieved regardless of some misalignment during the attaching operation. However, when subjected to high speed rolling motion in a state of relatively elevated temperatures, the tire inner surface deforms and compacts rapidly. When this is repeated over an extended period of time in high speed, partial physical deterioration in the surface fastener is produced. As this deterioration progresses, deterioration and decline over time of the engagement force of an entirety of the surface fastener occurs. This leads to difficulties in retaining a desired engagement force over an extended period of time In light of this, the present inventors have proposed a pneumatic tire which includes a separatable pair of mechanical fasteners, wherein a first fastener of the pair of separatable pair of mechanical fasteners is provided on a tire inner surface (see Japanese Unexamined Patent Application Publication Nos. 2012-025318A and 2012-240465A). These pneumatic tires are essentially free of the problems described above and in particular, the obtained engagement force is great and is essentially free of variations (positional variation within the tire and variation from tire to tire). Furthermore, the engagement force deteriorates/declines minimally over time due to extreme usage conditions including deformation and compaction of the tire inner surface caused by high speed tire rolling motion in a state of relatively elevated temperatures being repeated for an extended period of time; and the desired engagement force can be maintained over an extended period of time.

Approaches using such mechanical fasteners have been superior from the perspective of the strength of obtained engagement force, variation in strength, and reliability of engaging operations. As an approach to an attachment method for one fastener to the tire inner surface, the present inventors have proposed individually embedding the fasteners in a tread rubber and vulcanizing the tire, and a mechanical fastener composed of at least two fastener members that is a first mechanical fastener of a separatable pair of mechanical fasteners which is disposed on a tire inner surface, and the two fastener members form the first fastener of the pair of mechanical fastener on a tire inner surface by fixing together while sandwiching a rubber layer, which is a tire component, or a rubber-coated fiber reinforced member (see Japanese Unexamined Patent Application Publication No. 2012-025318A).

The present inventors have also proposed disposing the first fastener of the pair of mechanical fasteners on the tire inner surface in a configuration in which the at least two fastener members are fixed together while sandwiching a woven fabric or nonwoven fabric made of fibers (see Japanese Unexamined Patent Application Publication No. 2012-240465A).

However, with these approaches, depending on the form of the mechanical fastener and the position where it is attached, the desired attachment strength may not be obtained, and the durability and the long lifetime with respect to the pneumatic tire provided with an object having a specific function may not be sufficient.

It is desirable for the attachment strength of the mechanical fastener to be greater and have a longer lifetime so that it can have application to objects having a specific function disposed inside the tire that have certain characteristics (mass, size, form, and the like).

SUMMARY

The present technology provides a pneumatic tire in which the obtained engagement force is great and is essentially free of variations (positional variation within the tire and variation from tire to tire). Furthermore, the engagement force deteriorates/declines minimally over time due to extreme usage conditions including deformation and compaction caused by high speed tire rolling motion in a state of relatively elevated temperatures being repeated for an extended period of time. The pneumatic tire also includes a highly effective mechanical fastener disposed inside the pneumatic tire, with the attachment strength of the mechanical fastener to the tire inner surface being great, and a desired functional object having a specific function and certain characteristics (mass, size, form, and the like) being able to remain attached for an extended period of time.

A pneumatic tire of an embodiment of the present technology that achieves the aforementioned object has configuration (1) below.

(1) A pneumatic tire, comprising:
a mechanical fastener disposed on a tire inner surface, the mechanical fastener being a first mechanical fastener of a separatable pair of mechanical fasteners and being composed of at least two fastener members; wherein
    a) the at least two fastener members sandwich a rubber-coated fiber reinforced member and fix together;
    b) the mechanical fastener is disposed at a position within a region such that the following relationship is satisfied:

$$0.05 \leq A/H \leq 0.4$$

where A is a height in a tire radial direction from a bead toe end to a center position of the mechanical fastener, and H is a height of a cross section of the tire; and
    c) the fiber reinforced member includes a plurality of fiber bundles disposed in alignment in at least one direction, and at least one direction of the at least one direction in which the fiber bundles are aligned forms an angle (minor angle θ) with a tire circumferential direction such that:

$$30 \text{ degrees} \leq \theta \leq 90 \text{ degrees.}$$

A pneumatic tire according to an embodiment of the present technology is preferably further configured as described in any one of (2) to (12) below.

(2) The pneumatic tire according to (1) or (2), wherein the fiber reinforced member is composed of organic fiber bundles with a Young's modulus of from 1 to 15 GPa.

(3) The pneumatic tire according to (1) or (2), wherein a relationship: BL/CL≤1 is satisfied, where BL is a circumferential length of a fiber bundle B with the greatest circumferential length, and CL is a radial length of a fiber bundle C with the greatest radial length among the fiber bundles which compose the fiber reinforced member; and the angle (minor angle θ) formed between the at least direction in which the fiber bundle B or the fiber bundle C is aligned and the tire circumferential direction is such that:

70 degrees≤θ≤90 degrees.

(4) The pneumatic tire according to (1) or (2), wherein a relationship: BL/CL>1 is satisfied, where BL is a circumferential length of a fiber bundle B with the greatest circumferential length, and CL is a radial length of a fiber bundle C with the greatest radial length among the fiber bundles which compose the fiber reinforced member; and the angle (minor angle θ) formed between the at least direction in which the fiber bundle B or the fiber bundle C is aligned and the tire circumferential direction is such that:

70 degrees≤θ≤90 degrees.

(5) The pneumatic tire according to (1) or (2), wherein the fiber reinforced member is composed of a plurality of fiber bundles aligned in one direction.

(6) The pneumatic tire according to (3) or (4), wherein the fiber reinforced member includes at least two fiber reinforced layers composed of a plurality of fiber bundles aligned in one direction; and the at least two fiber reinforced layers have a layered configuration with a fiber bundle alignment direction of adjacent fiber reinforced layers of the at least two fiber reinforced layers intersecting.

(7) The pneumatic tire according to any one of (1) to (6), wherein the fiber reinforced member has a number of fiber bundles Y per unit width of the fiber reinforced member (bundle/50 mm width) that satisfies:

20≤Y(bundle/50 mm width)≤90.

(8) The pneumatic tire according to any one of (1) to (7), wherein a number of the fiber bundles in the fiber reinforced member that pass through a fastener region where the mechanical fastener projects on the tire inner surface is from 2 to 90.

(9) The pneumatic tire according to any one of (1) to (8), wherein the fiber reinforced member has a contour shape when viewed in a plan view without sharp corner portions, and is composed of a curved line with a radius of curvature of 5 mm or greater or composed of a combination of a curved line with a radius of curvature of 5 mm or greater and a straight line.

(10) The pneumatic tire according to any one of (1) to (9), wherein a contour shape of the mechanical fastener which projects on the tire inner surface has a distance R of from 2 mm to 60 mm, where R is a distance from a center of gravity position of the contour shape to a discretionary position on a line of the contour furthest away from the center of gravity position.

(11) The pneumatic tire according to any of (1) to (10), further comprising an object attached to a second fastener that engages with the first fastener on the tire inner surface, wherein the object is fixed on the tire inner surface by engaging the first fastener and the second fastener together.

(12) The pneumatic tire according to (11), wherein the object attached to the second fastener is one or a combination of two or more of (a) an electronic circuit comprising a sensor, (b) a balance weight, (c) a run-flat core, (d) an object on which an oxygen scavenger, a drying agent, and/or an ultraviolet light detecting color fixing agent is applied or mounted, (e) a noise absorbing member, and (f) a surface fastener member.

According to an embodiment of the present technology according to (1), a pneumatic tire can be achieved which includes a mechanical fastener with a great obtained engagement force and is essentially free of variations (positional variation within the tire and variation from tire to tire). Furthermore, the engagement force deteriorates/declines minimally over time due to extreme usage conditions including deformation and compaction caused by high speed tire rolling motion in a state of relatively elevated temperatures being repeated for an extended period of time, and thus the attachment strength of the mechanical fastener to the tire inner surface is great.

Thus, according to an embodiment of the present technology according to (1), with these effects a pneumatic tire can be achieved which includes a superior mechanical fastener inside the tire. The mechanical fastener can keep a desired functional object having a specific function and certain characteristics (mass, size, form, and the like) attached inside the tire for an extended period of time and thus keep the function working, without limiting or restriction the object in terms of certain characteristics.

According to the pneumatic tire according to embodiment of the present technologies according to any one of (2) to (10), a superior pneumatic tire can achieve the effects of the technology according to claim 1 described above to a greater extent and with more reliability.

According to embodiment of the present technology according to (11) or (12), a novel pneumatic tire or a functional object attached to a novel pneumatic tire can be achieved in which a functional object having desired functionality can be attached to a tire inner surface with great engagement force and superior durability.

DETAILED DESCRIPTION

The pneumatic tire according to embodiments of the present technology is described in detail below with reference to the drawings.

Figure 1A:
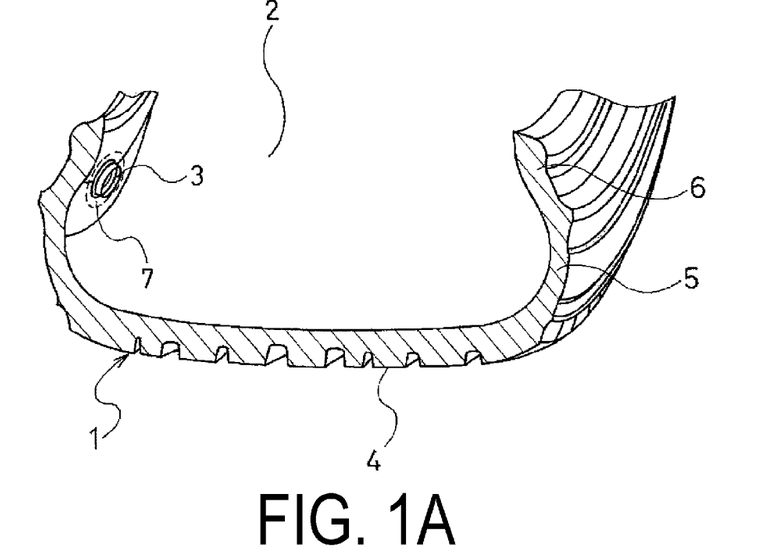
FIG. 1A is a partially fragmented cross-sectional perspective view for explaining a pneumatic tire of an embodiment of the present technology.
Figure 1B:
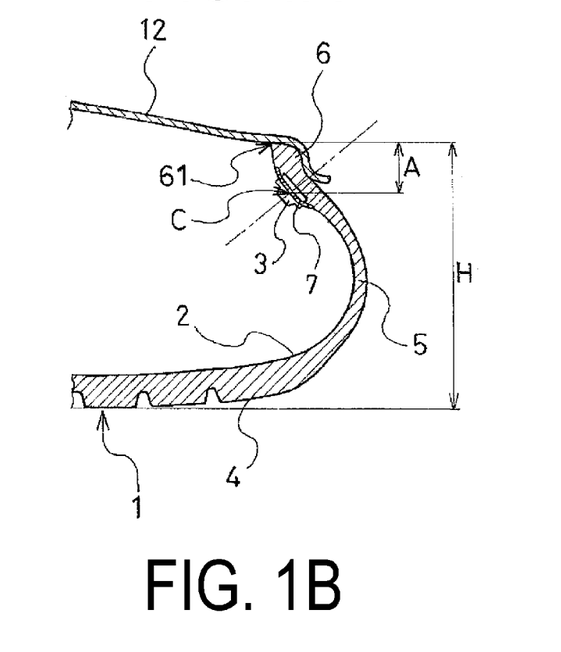
FIG. 1B is a cross-sectional view of a portion of a pneumatic tire of an embodiment of the present technology. The cross section in both drawings being taken along the tire meridian direction.
Figure 2A:
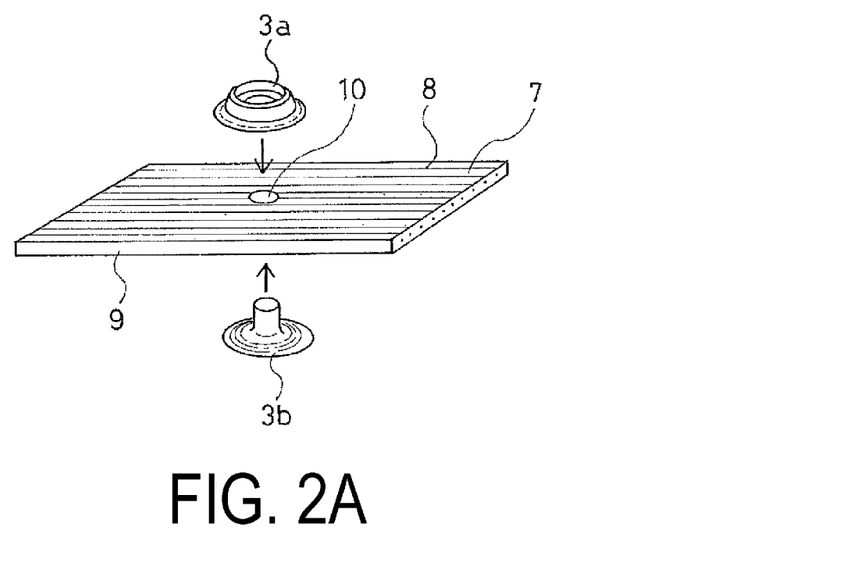
FIGS. 2A and 2B are perspective model diagrams for explaining a pneumatic tire of an embodiment of the present technology. The diagrams illustrate how two members that compose a first mechanical fastener of a separatable pair of mechanical fasteners used in a pneumatic tire of an embodiment of the present technology engage with each other while sandwiching a rubber-coated fiber reinforced member.
Figure 2B:
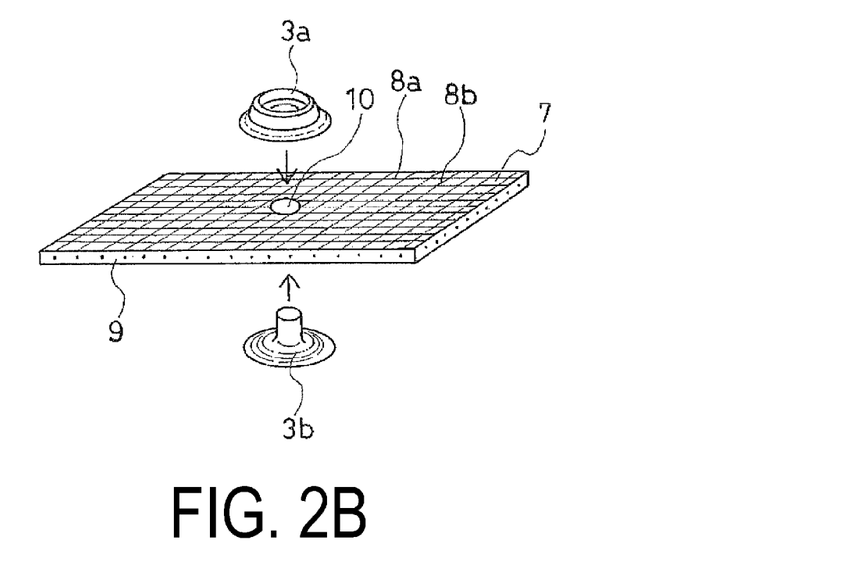
Figure 3A:
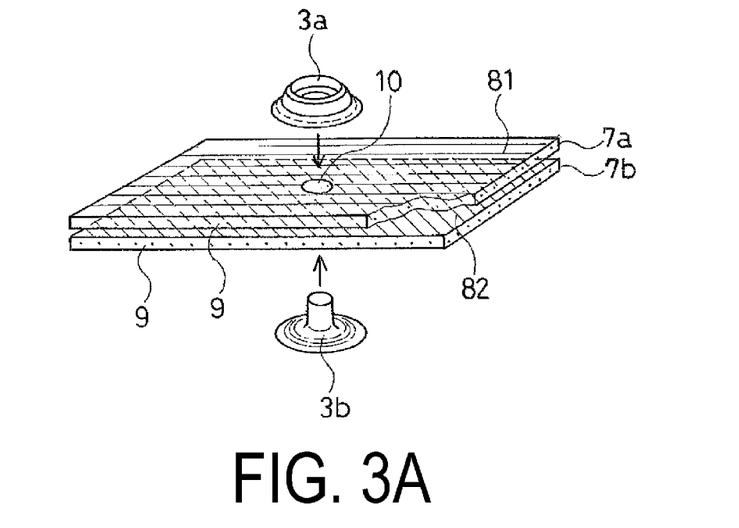
FIGS. 3A and 3B are partially fragmented perspective model diagrams for explaining a pneumatic tire of another embodiment of the present technology. The diagrams illustrate how two members that compose a first mechanical fastener of a separatable pair of mechanical fasteners used in a pneumatic tire of an embodiment of the present technology engage with each other while sandwiching two rubber-coated fiber reinforced members.
Figure 3B:
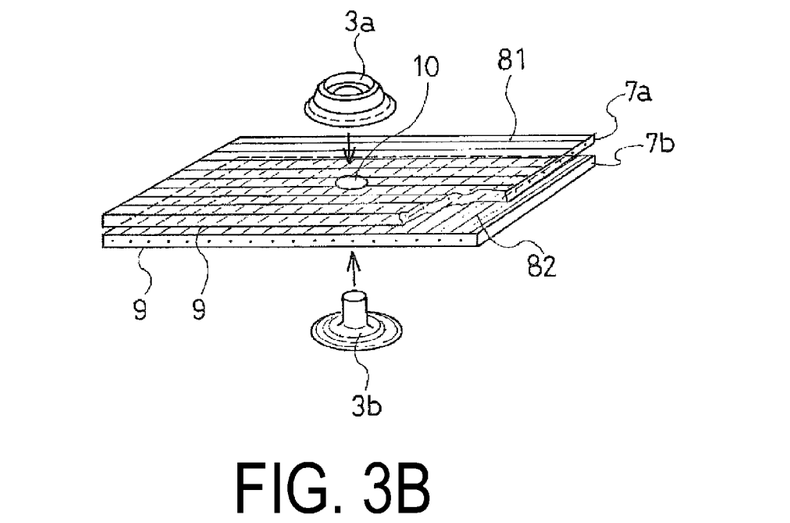

As illustrated in FIGS. 1A and 1B, a pneumatic tire 1 according to an embodiment of the present technology includes a mechanical fastener 3 on a tire inner surface 2. The mechanical fastener 3 is the first mechanical fastener 3 of a separatable pair of mechanical fasteners, and is composed of at least two fastener members 3a, 3b (see FIGS. 2 and 3). As illustrated in FIGS. 2 and 3, a) the at least two fastener members 3a, 3b sandwich a rubber-coated fiber reinforced member 7 and fix together. As illustrated in FIG. 1B, b) the mechanical fastener 3 is disposed at a position within a region such that the following relationship is satisfied:

$$0.05 \leq A/H \leq 0.4$$

where A is a height in a tire radial direction from a bead toe end 61 to a center position C of the mechanical fastener 3, and H is a height of the cross section of the tire. c) The fiber reinforced member 7 includes a plurality of fiber bundles 8 disposed in alignment in at least one direction. At least one direction of the directions in which the fiber bundles 8 are aligned forms an angle (minor angle θ) with the tire circumferential direction such that: 30 degrees≤θ≤90 degrees. In FIGS. 1A and 1B, 4 denotes a tread portion, 5 denotes a sidewall portion, 6 denotes a bead portion, and 12 denotes a rim.

FIGS. 2A and 2B are perspective model diagrams for explaining the configuration of the two members 3a, 3b which compose the first mechanical fastener 3 of the separatable pair of mechanical fasteners of how they engage with each other while sandwiching a single rubber-coated fiber reinforced member 7. FIG. 2A illustrates the fiber reinforced member 7 in which the fiber bundles 8 are aligned in one direction and disposed in a rubber coating 9. FIG. 2B illustrates a single layered fiber reinforced member with fiber bundles 8a, 8b in a two direction alignment configuration. In FIGS. 2 and 3, 10 denotes a hole provided in the fiber reinforced member 7 for receiving the mechanical fastener 3.

FIGS. 3A and 3B are partially fragmented perspective model diagrams for explaining the configuration of the two members 3a, 3b that compose the first mechanical fastener 3 of the separatable pair of mechanical fasteners of how they engage with each other while sandwiching two layered rubber-coated fiber reinforced members 7a, 7b. FIG. 3A illustrates the fiber reinforced member 7 in which fiber bundles 81 of the fiber reinforced member 7a and fiber bundles 82 of the fiber reinforced member 7b are disposed in alignment in a manner such that their respective directions intersect at an angle of approximately 45 degrees and are disposed in respective rubber coatings 9. FIG. 3B illustrates the fiber reinforced member 7 in which the fiber bundles 81 of the fiber reinforced member 7a and the fiber bundles 82 of the fiber reinforced member 7b are disposed in a manner such that their respective directions intersect at an angle of approximately 90 degrees.

In the present technology, "mechanical fastener" is a mechanical fastener basically similar to that described in Japanese Unexamined Patent Application Publication Nos. 2012-025318A and 2012-240465A described above, and refers to a pair of fastener members configured to be separable and so that engagement and separation of the pair can be freely repeated. Exemplary types of such a mechanical fastener are those known as "hooks" or "snaps". Specific examples of products in the clothing industry that are generally included as mechanical fasteners are snap buttons, ring snaps, ring hooks, American snaps, American hooks, eyelet hooks, spring hooks, and jumper hooks.

Such mechanical fasteners differ from surface fasteners in that while an area of the engaging part of a surface fastener is unlimited in the entire area, the area of the engaging part of a mechanical fastener is small (preferably from about 1 to 115 mm$^2$, and more preferably from about 4 to 90 mm$^2$, for example). In other words, the mechanical fastener is a point fastener. Thus, even when engaged at a small area of from about 1 to 115 mm$^2$ for example, due to a mechanical male-female structure or the like, strong engaging is achieved. Thus, a conventional structure for the mechanical fastener may be used. The mechanical fastener may be made from a metal, a rubber, a synthetic resin material, or the like.

In an embodiment of the present technology, as illustrated in FIG. 1B, the mechanical fastener 3 is disposed at a position within a region such that the following relationship is satisfied:

$$0.05 \leq A/H \leq 0.40$$

where A is the height in the tire radial direction from the bead toe end 61 to the center position C of the mechanical fastener 3, and H is the height of the cross section of the tire. Additionally, to ensure that the attachment strength of the mechanical fastener 3 to the tire inner surface is sufficiently high, the at least two fastener members 3a, 3b fix together while sandwiching the rubber-coated fiber reinforced member 7, and as illustrated in FIGS. 2 and 3, the fiber reinforced member 7 includes a plurality of fiber bundles 8 (8a, 8b, 81, 82) disposed in alignment in at least one direction with at least one direction of the directions in which the fiber bundles 8 (8a, 8b, 81, 82) are aligned forms an angle (minor angle θ) with the tire circumferential direction such that:

30 degrees≤θ≤90 degrees. Note that "minor angle" refers to the smaller angle of two angles sharing the same vertex and two sides.

In other words, in an embodiment of the present technology, the fiber reinforced member should include a plurality of fiber bundles disposed in alignment in at least one direction (FIG. 2A). The reason for this is the repeated distortion on the tire inner surface caused by the rolling motion of the tire typically has at least one substantially fixed directional element to it, and by using a mechanical fastener with the alignment direction of the fiber bundles being specified to be in accordance with this direction, effective reinforcement can be achieved. Thus, no embodiments of the present technology include a nonwoven fabric that includes fibers without directionality to their alignment used alone.

Additionally, at least two types of distortion are known to be repeatedly experienced by the tire inner surface due to the rolling motion of the tire: circumferential distortion and lateral distortion. To counter the distortion in these direction, the fiber reinforced member may include a plurality of fiber bundles disposed in alignment in at least two directions (FIGS. 2B, 3A, and 3B).

Note that in the present technology, "fiber reinforced member includes fiber bundles disposed in alignment in one direction" includes in its meaning a configuration in which a plurality of fiber bundles are disposed mostly in alignment in one direction, as well as a configuration in which a small number of the fiber bundles are aligned in a different direction for the sake of retaining the configuration of the entirety of the fiber bundles, providing identification marks, and the like (configuration in which a cord fabric is employed, for example).

In both embodiments with the fiber bundles aligned in one direction and embodiments with the fiber bundles aligned in at least two direction, the direction of alignment of the fiber bundles in the fiber reinforced member described above should at least form an angle (minor angle θ) with the tire circumferential direction such that:

30 degrees≤θ≤90 degrees, and preferably:

70 degrees≤θ≤90 degrees, with the proviso that the mechanical fastener 3 is disposed at a position (position at which the fiber reinforced member 7 is disposed) within the region indicated by the relationship expression of A and H described above.

The relationship between the position at which the mechanical fastener 3 is disposed and the alignment direction of the fiber bundles in the fiber reinforced member 7 is important. It is desirable from the perspective of durability to disposed the mechanical fastener 3 in proximity to one of the two bead portions 6 disposed on opposite sides rather than on the under side of the tread surface as a measure against road surface disturbances during actual travel. In other words, if the mechanical fastener 3 is disposed on the under side of the tread surface, both the amount of rotational movement and speed of the fastener due to the rotation of the tire is great, and the tire inner surface experiences repeated circumferential and lateral distortion accompanying the rotation of the tread surface. These conditions have a greatly adverse effect on durability.

In embodiments of the present technology, by disposed the mechanical fastener in proximity to the bead portion 6, such problems are alleviated. However, in proximity to the bead portion, circumferential distortion is much more of a factor for distortion of the tire inner surface (liner distortion) than lateral distortion. Thus, by the alignment direction of the fiber bundles being inclined with respect to the tire circumferential direction, stress caused by distortion is reduced, and the mechanical fastener and an object having a specific function secured by the mechanical fastener are more effectively prevented from falling off.

As described above, the mechanical fastener 3 is disposed at a position within a region such that the relationship:

0.05≤A/H≤0.40 is satisfied, and preferably within a region such that the relationship:

0.1≤A/H≤0.2 is satisfied. Additionally, the angle (minor angle θ) formed by the fiber bundles and the tire circumferential direction is preferably such that:

70 degrees≤θ≤90 degrees.

The fiber reinforced member 7 should be rubber coated. In the tire vulcanization process, the rubber of the tire and the rubber-coated fiber reinforced member strongly vulcanization-bond together, and the rubber inbetween the fibers of the fiber reinforced member vulcanizes so that the tire inner surface, the fiber reinforced member, and the mechanical fastener are strongly adhered and bonded.

By employing the fiber reinforced member 7 in such a manner, firstly, a mechanical fastener can be achieved in which the obtained engagement force is great and essentially free of variations (positional variation within the tire and variation from tire to tire). Furthermore, the engagement force deteriorates/declines minimally over time due to extreme usage conditions including deformation and compaction caused by high speed tire rolling motion in a state of relatively elevated temperatures being repeated for an extended period of time. Secondly, a pneumatic tire can be achieved which includes a highly effective mechanical fastener disposed inside the pneumatic tire, with the attachment strength of the mechanical fastener to the tire inner surface being great, and a desired functional object having a specific function and certain characteristics (mass, size, form, and the like) being able to remain attached for an extended period of time.

In particular, in cases of mechanical fasteners in which only the engagement force is great and the attachment strength to the tire inner surface is low, as the service life of the tire continues, a functional object attached to the tire inner surface will fail to retain its proper position on the tire inner surface or its original correctly disposed form. This leads to the function of the functional object ceasing, and thus such configurations are not desirable.

Accordingly, positioning of the object to be attached at an engagement position (point of engagement) of the tire inner surface is performed by precisely disposing the fastener at a corresponding position on the tire inner surface. Therefore, it is possible to easily accommodate cases where a high level of precision is required in disposing the object at a position (placement position). This is of great importance because positioning is performed on the tire inner surface, in particular the under side of the sidewall, which is a narrow, curved or uneven surface in three-dimensional space.

Figure 4A:
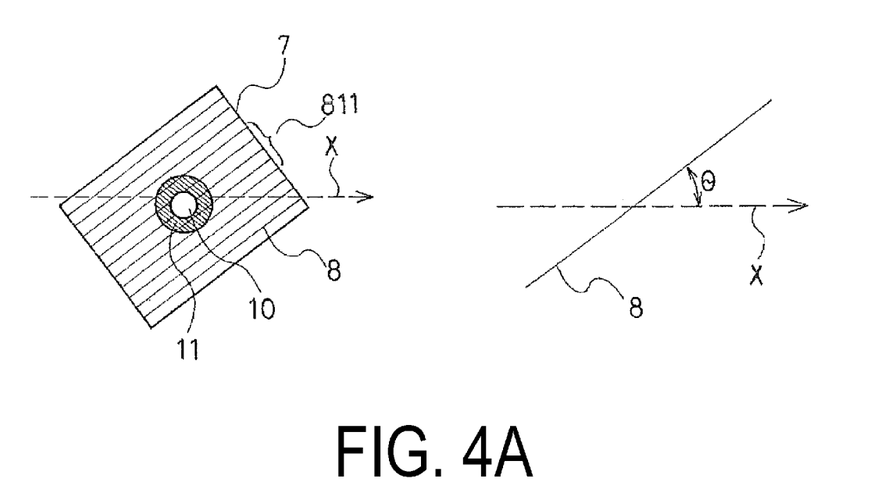
FIGS. 4A and 4B are model diagrams for explaining an angle θ formed between a direction of alignment of fiber bundles in a fiber reinforced member and a tire circumferential direction X.
Figure 4B:
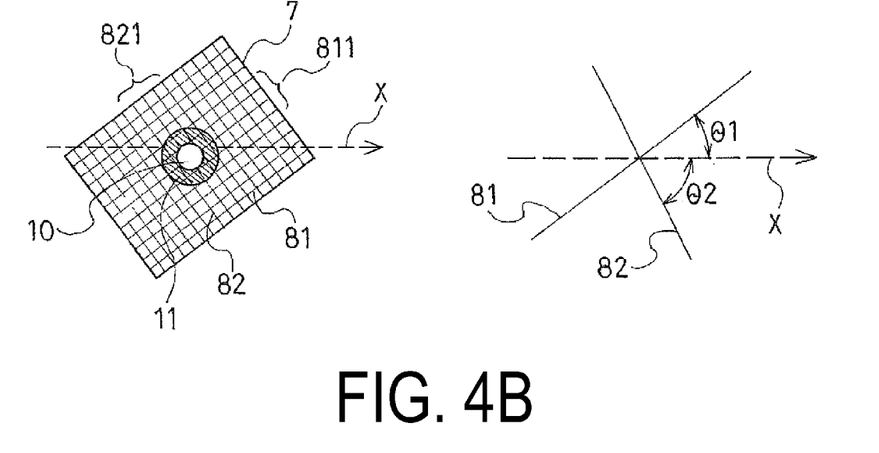

The relationship between the tire circumferential direction and the direction in which the fiber bundles are aligned is explained below using the model diagrams of FIGS. 4A and 4B. FIG. 4A illustrates an embodiment like that illustrated in FIG. 2A in which the fiber bundles 8 are aligned in one direction. The direction of the fiber bundles 8 aligned in one direction with respect to the tire circumferential direction forms an angle (minor angle) θ with the tire circumferential direction. The diagram to the right of FIG. 4A is an enlarged model diagram of the diagram to the left of FIG. 4A. FIG. 4B illustrates an embodiment like that illustrated in FIGS. 3A and 3B in which the fiber bundles 81, 82 are aligned in two directions. The direction of the fiber bundles 81 with respect to the tire circumferential direction X forms an angle (minor angle) θ1 with the tire circumferential direction, and the direction of the fiber bundles 82 with respect to the tire circumferential direction X forms an angle (minor angle) θ2 with the tire circumferential direction. The diagram to the right of FIG. 4B is an enlarged model diagram of the diagram to the left of FIG. 4B.

As illustrated in FIG. 4B, in embodiments of the fiber reinforced member 7 in which at least the fiber bundles 81, 82 are aligned in at least two directions, and at least one of the angles (minor angles) θ1, θ2 formed with the tire circumferential direction is preferably such that:

$$30 \text{ degrees} \leq \theta \leq 90 \text{ degrees}.$$

Note that in the present technology, "angle formed with the tire circumferential direction" refers to the angle formed with the tire circumferential direction at the position of the fiber bundle, and, as the tire circumferential direction has an arcuate curved line in proximity to the bead portion, is the angle formed with the tangent line direction of this arcuate curved line.

In embodiments of the present technology, the mechanical fastener 3 is attached at a position in proximity to the bead portion 6. In this region, circumferential distortion is much more of a factor for distortion of the tire inner surface (liner distortion) than lateral distortion. Thus, by specifying the relationships between the direction(s) in which the fiber bundles 8 (8a, 8b, 81, 82) in the fiber reinforced member 7 are aligned, the form of the fiber reinforced member 7 when viewed in a plan view, and the tire circumferential direction and tire radial direction, the pneumatic tire of embodiments of the present technology and use thereof can be effective.

Specifically, a first embodiment of two exemplary embodiments, preferably has the relationship:

$$BL/CL \leq 1,$$

where BL is the circumferential length of fiber bundle B with the greatest circumferential length, and CL is the radial length of fiber bundle C with the greatest radial length among the fiber bundles 8 (8a, 8b, 81, 82) which compose the fiber reinforced member 7; and the angle (minor angle) θ formed between the direction in which the fiber bundle B or fiber bundle C is aligned and the tire circumferential direction preferably being such that:

$$30 \text{ degrees} \leq \theta \leq 90 \text{ degrees},$$

and more preferably:

$$70 \text{ degrees} \leq \theta \leq 90 \text{ degrees}.$$

Figure 5A:
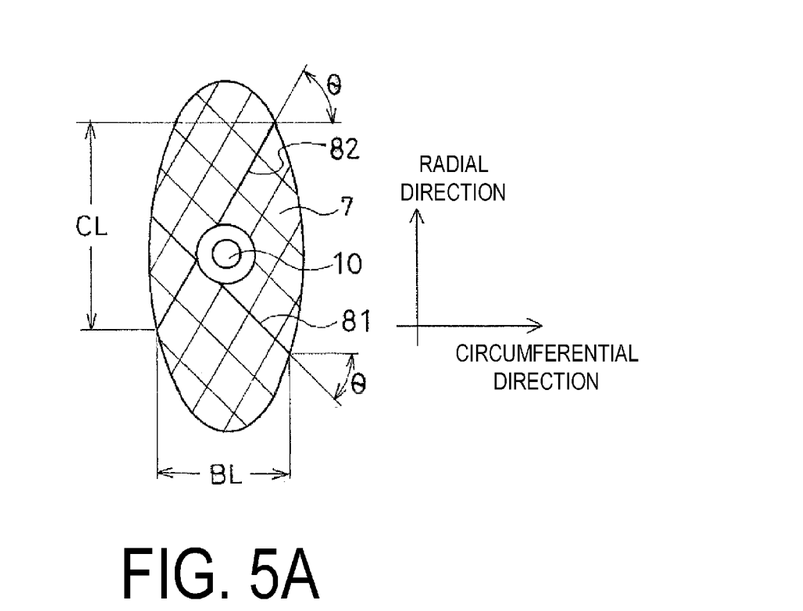
FIGS. 5A and 5B are plan views for explaining preferred shapes of a fiber reinforced member able to be used in embodiments of the present technology, and is particular for explaining the relationships between the direction in which the fiber bundles in the fiber reinforced member are aligned, the form of the fiber reinforced member when viewed in a plan view, and the tire circumferential direction and the tire radial direction.
Figure 5B:
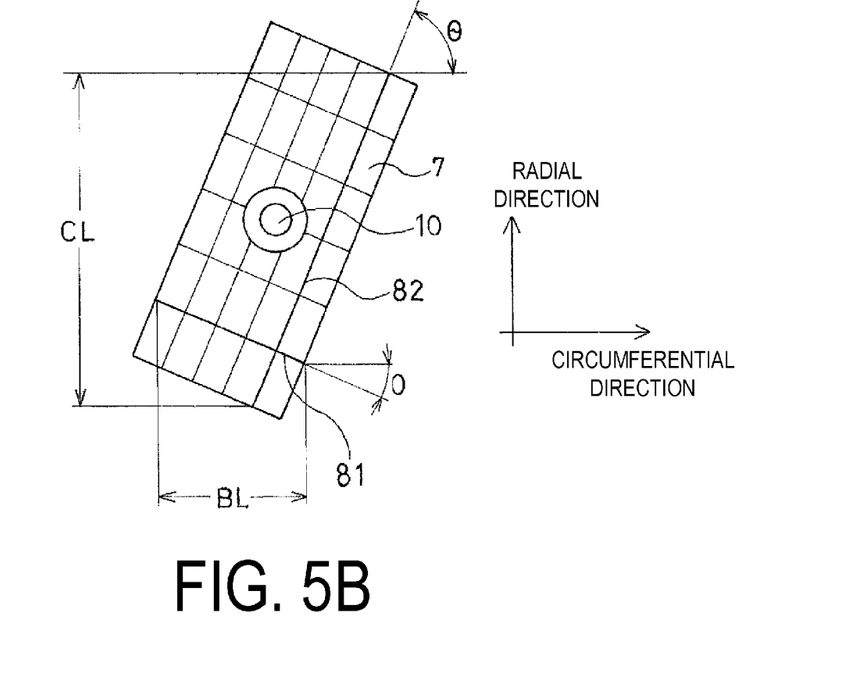

The first embodiment is illustrated in FIGS. 5A and 5B. The first embodiment is a preferred embodiment because to prevent the mechanical fastener from falling off, it is desirable to reduce the rigidity in the tire circumferential direction by making the length of the circumferential fiber bundles, where stress in the bead portion originates, less than the length of the radial fiber bundles.

A second embodiment of two exemplary embodiments, preferably has the relationship:

$$BL/CL > 1,$$

where BL is the circumferential length of fiber bundle B with the greatest circumferential length, and CL is the radial length of fiber bundle C with the greatest radial length among the fiber bundles 8 (8a, 8b, 81, 82) which compose the fiber reinforced member 7; and the angle (minor angle θ) formed between the direction in which the fiber bundle B or fiber bundle C is aligned and the tire circumferential direction preferably being such that:

$$30 \text{ degrees} \leq \theta \leq 90 \text{ degrees},$$

and more preferably:

$$70 \text{ degrees} \leq \theta \leq 90 \text{ degrees}.$$

Figure 6:
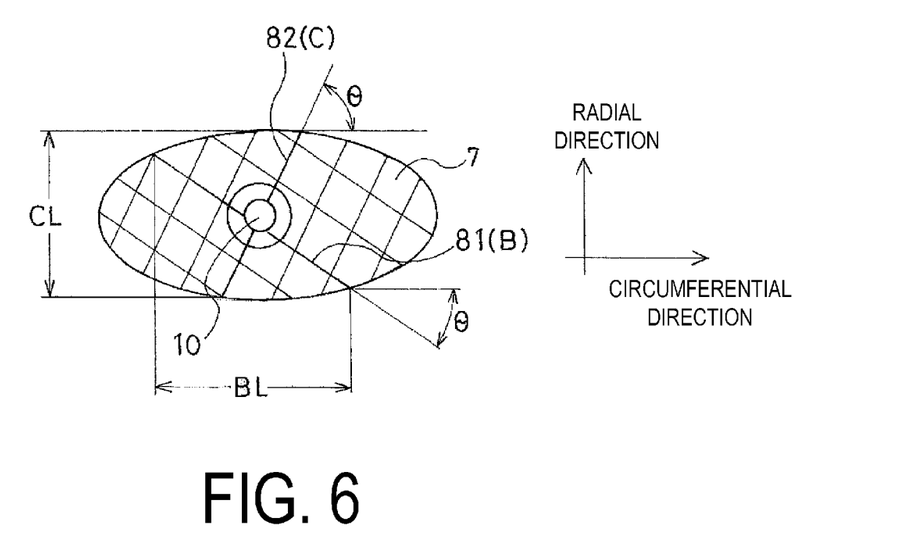
FIG. 6 is a plan view for explaining another preferred shape of a fiber reinforced member able to be used in embodiments of the present technology, and is particular for explaining the relationships between the direction in which the fiber bundles in the fiber reinforced member are aligned, the form of the fiber reinforced member when viewed in a plan view, and the tire circumferential direction and the tire radial direction.

The second embodiment is illustrated in FIG. 6. The second embodiment is a preferred embodiment because the vector (direction) of the circumferential distortion is known to varying depending on the radial position; thus the radial length of the fiber bundle is preferably short so to effectively match the vector of the distortion and to prevent the mechanical fastener from falling off.

Whether the first embodiment and the second embodiment are suitable for a certain pneumatic tire depends on the size, running conditions, and the like of the tire.

The fiber bundles that compose the fiber reinforced member preferably have a Young's modulus of from 1 GPa to 15 GPa. By employing fiber bundles with a Young's modulus within this range, the rubber-coated fiber reinforced member can be made of relatively flexible rubber composite material and can have superior durability due to being able to better deform in accordance with the repeated distortion at the tire inner surface caused by the rolling motion of the tire. To ensure stable performance, the fiber bundles are preferably made of organic fibers. Examples include fiber bundles made of nylon 6, which have a Young's modulus of 4 GPa, which is within a more preferred range for the Young's modulus of from 2 GPa to 8 GPa.

The fibers that compose the fiber reinforced member are preferably made of chemical fibers or long-length fibers (filament fibers) of synthetic fiber to ensure good physical properties and stable quality. Made of these, a sheet with fibers laid in parallel, a cord fabric, a plain weave fabric, and the like with a density of approximately from 20 g/m² to 300 g/m² are particularly preferably used, from the perspective of high strength and high durability. In particular, the density is preferably within the range described above because in such an embodiment, attachment durability can be ensured and rubber can easily enter between the fibers and between the fiber bundles, thus facilitating the formation of a strong vulcanization bond. The density is more preferably from 30 g/m² to 200 g/m². The fiber is preferably a chemical or synthetic fiber such as rayon fiber, nylon fiber, polyester fiber, or polyethylene fiber to ensure stable procurement and high quality.

"Fiber bundle" refers to a unit which is a plurality of fibers collected together as one strand. Alternatively, it may refer to a single unit which is a composite structure of a plurality of strands grouped or twisted together.

The number of fiber bundles Y per unit width (bundle/50 mm width) of the fiber reinforced member is preferably such that:

$$20 \leq Y \text{ (bundle/50 mm width)} \leq 90.$$

Embodiments in which the number of fiber bundles Y (bundle/50 mm width) is less than 20 bundles/50 mm width are not preferred because the effect of increasing the attachment strength obtained by disposing the fiber reinforced member is not obtained. Embodiments in which the number of fiber bundles Y is greater than 90 bundles/50 mm width are typically not preferably because the difference in rigidity between the regions of the tire inner surface with and without the fiber reinforced member becomes excessive.

Figure 7:
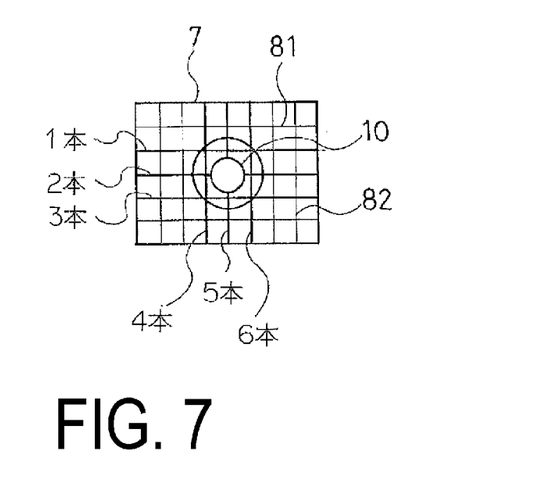
FIG. 7 is a plan view for explaining a preferred embodiment of the fiber reinforced member 7 able to be used in embodiments of the present technology, and in particular for explaining the number of fiber bundles.
Figure 8A:
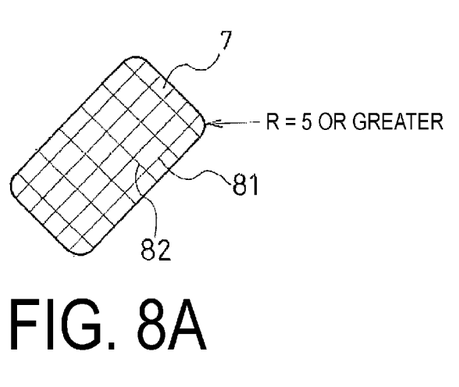
FIGS. 8A to 8D are plan views for explaining preferred shapes of the fiber reinforced member 7 able to be used in embodiments of the present technology, and in particular for explaining the contour shapes when the fiber reinforced member 7 is viewed in a plan view.
Figure 8B:
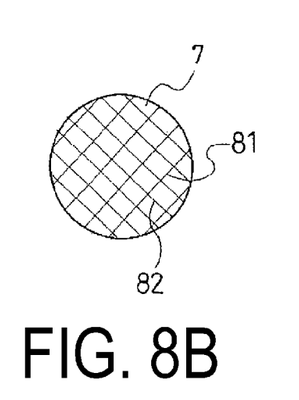
Figure 8C:
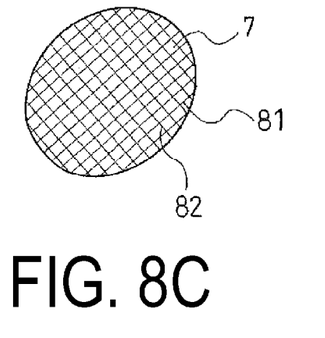
Figure 8D:
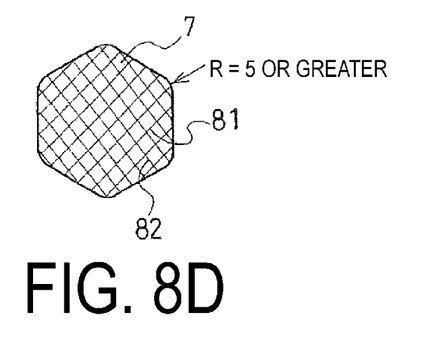

Additionally, the number of fiber bundles in the fiber reinforced member 7 that pass through a fastener region where the mechanical fastener projects on the tire inner surface is preferably from 20 to 90. The fiber reinforced member that functions to constrain the mechanical fastener to the tire inner surface has a preferred lower limit to the number of fiber bundles to ensure more stable fixing strength. Also, there is a preferred upper limit to the number of fiber bundles to ensure the flexibility of the fiber reinforced member and prevent the fastener and attached object from falling off. Accordingly, the number of fiber bundles is preferably from 2 to 90 and more preferably from 8 to 30. "Number of fiber bundles in the fiber reinforced member 7 that pass through a fastener region 11" refers to the total number of fiber bundles that pass through the region in any direction. For example, in the embodiment illustrated in the model diagram of FIG. 7 the number is 6 as indicated by the italicized numbers.

Additionally, the fiber reinforced member 7 preferably has a contour shape when viewed in a plan view without sharp corner portions and composed of a curved line with a radius of curvature of 5 mm or greater, or alternatively composed of a combination of a curved line with a radius of curvature of 5 mm or greater and a straight line. Specific examples of such shapes are illustrated in FIGS. 8A, 8B, 8C, and 8D. As shown in the above figures, preferred shapes include a rectangle or square with radiused corner portions (FIG. 8A), a circle (FIG. 8B), an ellipse (FIG. 8C), a regular polygon such as a regular hexagon with radiused corner portions (FIG. 8D), and the like.

Additionally, the contour shape of mechanical fastener 3, which projects on tire inner surface, preferably has a distance R of from 2 mm to 60 mm, where R is the distance from a center of gravity position to a discretionary position on the contour line furthest away from the center of gravity position. To ensure the fixing strength of the fastener, the fastener mounted on the tire inner surface has a preferred lower limit to its diameter. Also, there is also a preferred upper limit to alleviate the possibility of vulcanization defects when producing the pneumatic tire that may occur if the diameter is too great. According to the knowledge of the present inventors, the distance R is preferably from 2 mm to 60 mm. In FIGS. 9A, 9B, 9C, and 9D illustrate the distance R from the center of gravity position to a discretionary position on the contour line furthest away from the center of gravity position of a circle, an equilateral triangle, an ellipse, and a cog shape, respectively.

An adhesion area S ($cm^2$) of the fiber reinforced member 7 to the tire inner surface is preferably such that the following is satisfied:

$12 \leq S$ ($cm^2$)$\leq 300$. An adhesion area S of greater than 300 $cm^2$ leads to increase stress caused by distortion and thus more chance of members falling off. An adhesion area S of less than 12 $cm^2$ makes it difficult to obtain a stable fixing strength.

According to embodiments of the present technology, the object attached to a second fastener of the pair of mechanical fasteners can be disposed on an inner surface of a pneumatic tire by engaging the second fastener with the counterpart fastener 3 disposed on the tire inner surface side.

The object attached to the second fastener has various functions in line with the increasingly high-tech development of recent pneumatic tires. Examples of such functions include: (a) an electronic circuit including a sensor, (b) a balance weight, (c) a run-flat core, (d) an object on which an oxygen scavenger, a drying agent, and/or an ultraviolet light detecting color fixing agent is applied or mounted, (e) a noise absorbing member, (f) a surface fastener member, and the like. Exemplary examples of the object include those with a single function or a combination of multiple functions.

EXAMPLES

Working Examples 1 to 5, Comparative Example 1

Figure 9A:
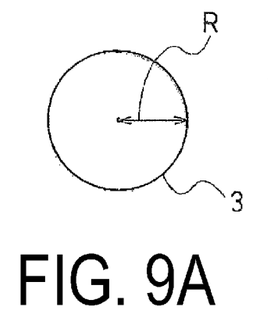
FIGS. 9A to 9D are plan views for explaining preferred shapes of the mechanical fastener able to be used in embodiments of the present technology, and in particular for explaining the contour shapes when the mechanical fastener is viewed in plan.
Figure 9B:
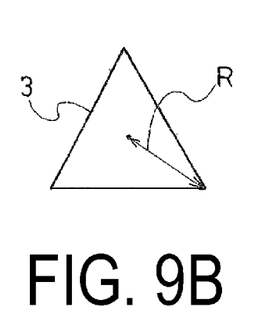
Figure 9C:
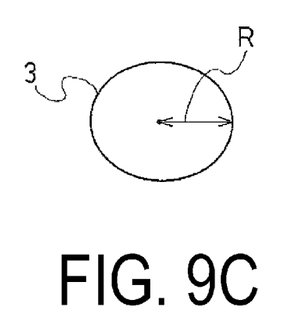
Figure 9D:
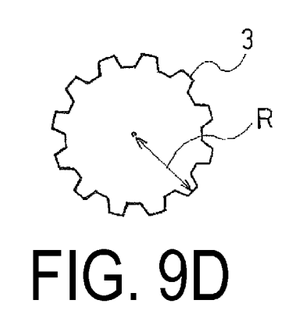

As the mechanical fastener members of the examples, a mechanical fastener member 3 with the configuration illustrated in FIG. 9A was used, the fiber reinforced member had specifications varying as shown in Table 1 and with the configurations illustrated in FIGS. 2A and 3A. A single mechanical fastener member 3 was disposed on the inner surface of a pneumatic tire (195/65R15) in proximity to the bead portion, and in the vulcanization molding of the tire, the mechanical fastener member was vulcanization bonded thereto. The position where the fastener was fixed, the form of the fiber reinforced member, and the like varied as shown in Table 1.

TABLE 1

|  | Comparative Example 1 | Working Example 1 | Working Example 2 | Working Example 3 | Working Example 4 |
|---|---|---|---|---|---|
| Mechanical fastener fixing position A/H | 0.1 | 0.1 | 0.1 | 0.1 | 0.1 |
| Use of fiber reinforced member | No (Used rubber reinforcing member) | Yes | Yes | Yes | Yes |
| Reinforcing fiber (Young's modulus) | N/A | Carbon (20 GPa) | Nylon 6 (5 GPa) | Nylon 6 (5 GPa) | Nylon 6 (5 GPa) |
| Fiber bundle alignment direction in one fiber reinforced member | — | 1 direction | 1 direction | 1 direction | 1 direction |
| Number of fiber reinforced members | — | Two members | Two members | Two members | One member |
| Fiber bundle direction in fiber reinforced member | N/A | Two members Intersect | Two members Intersect | Two members Intersect | One member No |

TABLE 1-continued

|  |  |  |  |  |
|---|---|---|---|---|
|  | among members | among members | among members | intersection |
| Angle θ between tire circumferential direction and fiber bundle | — | 45 degrees 45 degrees | 45 degrees 45 degrees | 45 degrees 45 degrees | 80 degrees |
| Number of fiber bundles in fiber reinforced member (Bundle/50 mm) | — | 15 | 15 | 15 | 15 |
| Form of fiber reinforced member (BL/CL) |  | (1.0) | (1.0) | (0.6) | (0.6) |
| Number of fiber bundles passing through fastener region | — | 3 | 3 | 3 | 3 |
| Fastener contour shape | Square | Square | Square | Square | Square |
| Distance R (mm) | 5 | 5 | 5 | 5 | 5 |
| Durability | 100 | 110 | 115 | 120 | 125 |

|  | Working Example 5 | Working Example 6 | Comparative Example 2 | Comparative Example 3 |
|---|---|---|---|---|
| Mechanical fastener fixing position A/H | 0.1 | 0.1 | 0.45 | 0.1 |
| Use of fiber reinforced member | Yes | Yes | Yes | Yes |
| Reinforcing fiber (Young's modulus) | Nylon 6 (5 GPa) | Nylon 6 (5 GPa) | Carbon (20 GPa) | Nylon 6 (5 GPa) |
| Fiber bundle alignment direction in one fiber reinforced member | 1 direction | 1 direction | 1 direction | 1 direction |
| Number of fiber reinforced members | One member | One member | Two members | One member |
| Fiber bundle direction in fiber reinforced member | One member No intersection | One member No intersection | Two members Intersect among members | One member No intersection |
| Angle θ between tire circumferential direction and fiber bundle | 80 degrees | 80 degrees | 45 degrees 45 degrees | 0 degrees |
| Number of fiber bundles in fiber reinforced member (Bundle/50 mm) | 30 | 30 | 15 | 30 |
| Form of fiber reinforced member (BL/CL) | (0.6) | (0.6) | (1.0) | (0.6) |
| Number of fiber bundles passing through fastener region | 6 | 6 | 3 | 6 |
| Fastener contour shape | Square | Circle | Square | Circle |
| Distance R (mm) | 5 | 5 | 5 | 5 |
| Durability | 130 | 135 | 95 | 100 |

The fasteners were evaluated for durability test as per the test described below.

(1) Fastener Durability Test

The mechanical fastener on the tire inner surface of the test tires and the counterpart mechanical fastener with a 100 g weight attached were fixed together. In this state, the test tires were placed on a drum and run to test durability. The distance ran until the fastener on the tire inner surface fell off from the inner surface was found.

In the evaluation, the results of the working examples and comparative examples were expressed as index values with the running distance of Comparative Example 1, which used a rubber sheet instead of the fiber reinforced member, was defined as 100. Index values greater than 100 indicate superior performance and that a long distance was run. The conditions of the mandatory tests were:

the air pressure of the test tires (195/65R15) was 210 kPa, the running speed was 81 km/h, and 13% of the maximum load was added every 2 hours.

As can be seen from the obtained results of the test tires, the pneumatic tires according to the embodiments of the present technology had a greatly superior fixing strength for the mechanical fasteners.

The invention claimed is:

1. A pneumatic tire, comprising:
first mechanical fasteners disposed on a tire inner surface and separated from each other, each of the first mechanical fasteners being one of a separatable pair of mechanical fasteners and being composed of at least two fastener members; wherein
a) the at least two fastener members sandwich a rubber-coated fiber reinforced member and fix together;
b) the first mechanical fasteners are disposed at a position within a region such that the following relationship is satisfied:

$$0.05 \leq A/H \leq 0.4$$

where A is a height in a tire radial direction from a bead toe end to a center position of the first mechanical fasteners, and H is a height of a cross section of the tire; and
c) the rubber-coated fiber reinforced member includes a plurality of fiber bundles disposed in alignment in at least one direction, and at least one direction of the at least one direction in which the fiber bundles are aligned forms an angle θ with a tire circumferential direction such that:

$$30 \text{ degrees} \leq \theta \leq 90 \text{ degrees; and}$$

a number of the fiber bundles in the rubber-coated fiber reinforced member that pass through a fastener region where one of the first mechanical fasteners projects on the tire inner surface is from 2 to 90; wherein:
a contour shape of the one of the mechanical fasteners which projects on the tire inner surface has a distance R of from 2 mm to 60 mm, where R is a distance from a center of gravity position of the contour shape to a discretionary position on a line of the contour furthest away from the center of gravity position; and
a relationship: BL/CL≤1 is satisfied, where the BL is a circumferential length of a fiber bundle B with a greatest circumferential length, and the CL is a radial length of a fiber bundle C with a greatest radial length among the fiber bundles which compose the rubber-coated fiber reinforced member; and the angle (minor angle θ) formed between the at least direction in which the fiber bundle B or the fiber bundle C is aligned and the tire circumferential direction is such that 70 degrees ≤θ≤90 degrees.

2. The pneumatic tire according to claim 1, wherein the rubber-coated fiber reinforced member is composed of organic fiber bundles with a Young's modulus of from 1 to 15 GPa.

3. The pneumatic tire according to claim 1, wherein the rubber-coated fiber reinforced member is composed of a plurality of fiber bundles aligned in one direction.

4. The pneumatic tire according to claim 3, wherein
the rubber-coated fiber reinforced member includes at least two rubber-coated fiber reinforced layers composed of a plurality of fiber bundles aligned in one direction; and
the at least two rubber-coated fiber reinforced layers have a layered configuration with a fiber bundle alignment direction of adjacent fiber reinforced layers of the at least two rubber-coated fiber reinforced layers intersecting.

5. The pneumatic tire according to claim 1, wherein the rubber-coated fiber reinforced member has a number of fiber bundles Y per unit width of the rubber-coated fiber reinforced member (bundle/50 mm width) that satisfies:

20≤$Y$(bundle/50 mm width)≤90.

6. The pneumatic tire according to claim 1, wherein the rubber-coated fiber reinforced member has a contour shape when viewed in a plan view without sharp corner portions, and is composed of a curved line with a radius of curvature of 5 mm or greater or composed of a combination of a curved line with a radius of curvature of 5 mm or greater and a straight line.

7. The pneumatic tire according to claim 1, further comprising an object attached to a second fastener that engages with the first fastener on the tire inner surface, wherein the object is fixed on the tire inner surface by engaging the first fastener and the second fastener together.

8. The pneumatic tire according to claim 7, wherein the object attached to the second fastener is one or a combination of two or more of (a) an electronic circuit comprising a sensor, (b) a balance weight, (c) a run-flat core, (d) an object on which an oxygen scavenger, a drying agent, and/or an ultraviolet light detecting color fixing agent is applied or mounted, (e) a noise absorbing member, and (f) a surface fastener member.

* * * * *